A. P. VON POHRNHOFF.
Making Alkalies.
No. 67,087.
Patented July 23, 1867.
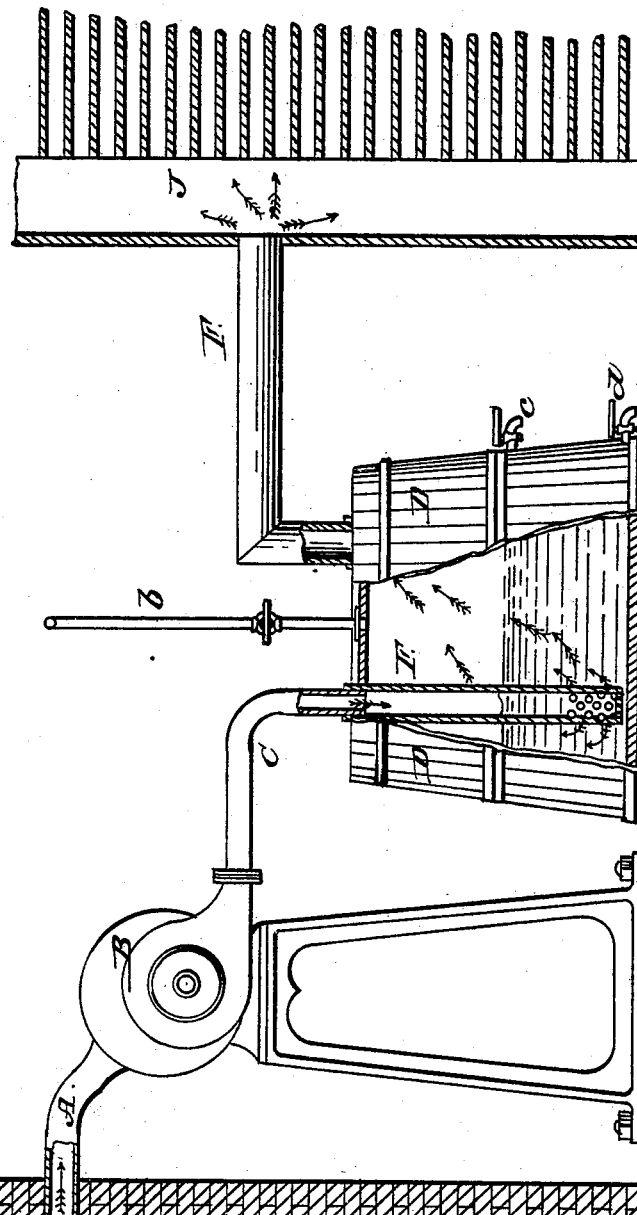

United States Patent Office.

ALOIS POHR VON POHRNHOFF, OF BROOKLYN, NEW YORK.

Letters Patent No. 67,087, dated July 23, 1867.

---

IMPROVED APPARATUS FOR THE MANUFACTURE OF BICARBONATE OF SODA.

---

*The Schedule referred to in these Letters Patent and making part of the same.*

---

TO ALL WHOM IT MAY CONCERN:

Be it known that I, ALOIS PÖHR VON PÖHRNHOFF, of the city of Brooklyn, Kings county, in the State of New York, have invented a new and improved Apparatus for Manufacturing Bicarbonate of Soda; and I do hereby declare that the following is a full and exact description thereof.

The process of manufacturing bicarbonate of soda, for which United States Letters Patent had been granted to me under April 15, current, stands in close connection with those means through which the carbonic gas, produced by the combustion of coals, &c., is gathered, and used for serving the double purpose of creating water-steam, as well as charging (converting into bicarbonate) the raw material, (in my process, hydrate of soda,) in a simultaneous co-operation with said steam. To find out such means—with other words, to construct an apparatus which would perform the desired functions in a practical, thorough, and also economical manner—has been the object of my researches and experiments.

The accompanying drawing will enable those skilled in the art to understand and use my invention.

A is the pipe which receives the gases from the chimney $a$, and conducts them to the blower B, which forces said gases through pipe C into the reservoir D. The latter is half filled with water, supplied by pipe C, regulated in its permanent stand by cock C, and let off, when needed, through cock $d$. Entering the vessel D by pipe C F, as mentioned above, the hot gases will, during their passage through the water, get (as has been amply proved by practical experiments on a large scale) "washed," and at the same time heat the water to such a degree as to create steam, the latter entering, simultaneously with the gas, through pipe E, the chamber or chambers $g$, wherein the raw material had been spread for its being "charged," viz, converted into bicarbonate of soda. To save money, labor, and time, and to prevent the wearing out of the apparatus, I have constructed the reservoir D and the pipe E of wood, impregnated with paraffine, and provided pipe C, where it enters the vessel D, with a wooden casing F, the same reaching down nearly to the bottom of the reservoir, as shown in the drawing, and made to fit hermetically by a packing-belt or ring. As, further, the gases, if entering the water in a bulk, would too abruptly force their way through the latter, and thus be but partially and insufficiently washed, I have provided the foot of casing F and its bottom with holes, by which the gases will be dispersed and enter the water in streamlets, thus perfecting said washing and heating process. Whether the blower B be placed fore or aft the reservoir D would not influence its satisfactory operation, but in standing, as shown in the drawing, between the chimney and the said vessel D, the blower will receive only dry gases, and consequently be greatly less subject to wear and repair. The reservoir D has a man-hole cut into its top, for cleaning, &c., purposes. It may be finally remarked that the shape of the pipes A C E F, whether they be round or angular, and the foot of the casing F being cut off straight or rounded, does not influence the process proper.

While the discovery and fixation of the fact that a simultaneous co-operation of carbonic gas and moist water-vapors is sufficient for bicarbonizing hydrate of soda without aid and admixture of crystallized or sal-soda, has been considered of sufficient strength for its being patented, the above apparatus will, I hope, be considered deserving the same privilege, as simplicity and cheapness of construction, rapidity and completeness of performance, form the principal merits of my apparatus, by whose means I am able to bicarbonize a given quantity of raw material within and even in less than so many hours as it has taken days for charging after the old methods, and with apparatus of any other construction. That my apparatus is based upon the principle of the "Wolf jar," known and used in experimental chemistry, will, I trust, offer no impediment to my being protected by Letters Patent, as the application of said principle to technical purposes on the largest scale, and still more to the manufacturing of bicarbonate of soda, finally, to the process, as patented to me on April 15, current, is, as for my best belief, a novelty, as well as an improvement upon the production of an article, the former modes of manufacturing of which could not prevent (which my process may do) immense quantities of bicarbonate of soda being imported from England and other countries.

What I do claim now as being my invention, and desire to secure by Letters Patent, is—

The arrangement and combination of pipes A C E F, blower B, and reservoir D, for the purpose and substantially as set forth above.

ALOIS POHR VON POHRNHOFF.

Witnesses:
E. J. SHERMAN,
JOHN BRAUN.